United States Patent Office 3,700,452
Patented Oct. 24, 1972

3,700,452
PHOTOSENSITIVE PRINTING-OUT COMPOSITION CONTAINING CHEMICALLY SENSITIZED ORTHO-RHOMBIC CRYSTALLINE Pb(II) OXIDE
Eric Maria Brinckman, Mortsel, Walter August Van den Heuvel, Berchem, Johan Eugeen Van Halst, Wilrijk, and Frans Clement Heugebaert, Kontich, Belgium, assignors to Gevaert-Agfa N.V., Mortsel, Belgium
No Drawing. Filed Nov. 12, 1969, Ser. No. 876,066
Claims priority, application Great Britain, Nov. 12, 1968, 53,670/68
Int. Cl. G03c 1/00
U.S. Cl. 96—88                              24 Claims

ABSTRACT OF THE DISCLOSURE

A print-out recording material and process using a recording layer containing as the essential photosensitive constituent thereof lead(II) oxide consisting at least 25% by weight of lead(II) oxide in the orthorhombic crystalline form, the lead oxide being dispersed in a hydrophilic water-permeable binding agent.

---

The present invention relates to photographic materials suited for image formation by printing-out.

The formation and development of latent silver images are generally known. The replacement of silver by other metals has been made the object of an intensive research in order to lower the cost of photographic materials.

Among photosensitive compounds of metals other than silver lead compounds such as lead iodide, lead azide or lead bromide have proved to be valuable as described, e.g., in the U.S. patent specification 2,414,839.

It has now been found that a photosensitive recording material suitable for print-out can be produced by means of lead(II) oxide as a photosensitive ingredient.

The use of lead(II) oxide in xerography is known, e.g., from the U.S. patent specification 3,008,825.

Two types of lead(II) oxide exist viz the commercially available lead(II) oxide, which is a yellow pigment having an orthorhombic crystalline structure, also called massicot, and the red to tan lead(II) oxide, which possesses a tetragonal crystalline structure, also called litharge. The large crystals of the latter are carmine red and the small are tan.

Vacuum-coated lead(II) oxide layers mainly consisting of the red modification are used in a light image-recording tube known as the "Plumbicon" described in Philips Technisch Tijdschrift 25, (1963) No. 9, p. 277–287.

The lead(II) oxide contained in the recording layers of the present invention preferably consists of lead(II) oxide of the yellow type.

However, doped yellow lead(II) oxide and mixtures of yellow and red lead(II) oxide are not excluded, and useful results can still be obtained with a lead(II) oxide mixture consisting for 75% by weight of red lead(II) oxide and 25% by weight of yellow lead(II) oxide.

The lead(II) oxide may be doped with a metal other than lead, e.g. with bismuth, molybdenum, lanthanum, copper and silver.

In order to obtain optimal results the grain size of the lead(II) oxide particles is as fine as possible and therefore preference is given to a lead(II) oxide powder the grains of which posses a specific surface of at least 0.30 sq. m. per gram.

Since the electrical resistivity of the print-out recording material according to the present invention is of no importance in the image-formation as is the case in electrophotography, any type of binding agent, can be used for binding the lead(II) oxide particles.

Preferably the recording layer has a permeable, preferably a water-permeable structure, enabling the penetration of a liquid, e.g. an equeous liquid used for sensitizing or stabilizing purposes.

A water-permeable structure of the recording layer can be obtained e.g. by using a water-permeable binding agent or binding agent composition, or by using a binding agent or binding agent composition by means of which on drying porous coatings are produced.

The novel recording process of the present invention is characterized by exposing a recording element containing lead(II) oxide to active electromagnetic radiation of such a degree that a print-out image is obtained.

By term "print-out" is meant the formation of a direct visible image by exposure of the recording layer to active electromagnetic radiation without the need of a developing step applied after the exposure.

The lead(II) oxide can obtain an increased photosensitivity for the production of print-out images by means of so-called chemical sensitizers.

It has been found that a marked increase of print-out photosensitivity is obtained by using said lead(II) oxide in admixture with an organic polyfunctional compound, of which at least two chemical functional groups are hydroxy and/or mercapto and/or primary or secondary amino groups. Particularly preferred organic polyfunctional compounds have at least one hydroxy group or neighbouring hydroxy, mercapto, primary or secondary amino groups as e.g. in 1,2-diol compounds, 1,2-hydroxyamino compounds, 1,2-mercapto hydroxy compounds, 1,2-mercapto amino compounds or 1,2-diamino compounds. Hydrogen in one of the 1,2-positioned or orthogroups can be replaced by a substituent e.g. an aliphatic group preferably an alkyl group.

A particularly valuable chemical sensitization is obtained by using for 1 mole of lead(II) oxide an amount of said polyfunctional organic compound in the range of 0.01 to 1.5 equivalent calculated on the basic of the hydroxy, mercapto, primary amino or secondary amino functional groups contained therein. Optimal sensitizing results are obtained with a said polyfunctional organic compound that contains at least one hydroxy group and is used in an amount of 1 mole divided by the number of hydroxy groups present in the polyfunctional molecule per mole of photosensitive lead(II) oxide. For example 0.5 mole of diethanolamine is used in admixture with 1 mole of lead(II) oxide.

Chemical sensitizers for the recording element in dry as well as in wet state correspond to the following general formulae:

(1)     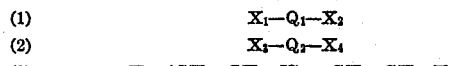
(2)     $X_1$—$Q_1$—$X_2$
(3)     $X_3$—$(CH_2$—$CH_2$—$Y)_m$—$CH_2$—$CH_2$—$X_4$
(4)     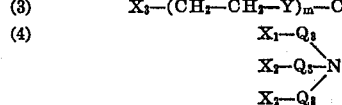

wherein:

$X_1$ stands for —OH, —SH, —NHR or a cyclic amino group, e.g. a

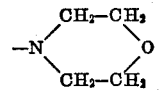

or

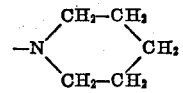

group, $X_2$ stands for —OH, —SH or a —NHR group,
$X_3$ stands for —OH, —SH, a —NHR, —CH$_2$OH, —CH$_2$SH, —CH$_2$NHR, —CO.R, —C(R)$_3$, a cyclic amino group or halogen,
$X_4$ stands for —OH, —SH, a —NHR, —CH$_2$OH, —CH$_2$SH or a —CH$_2$NHR group,
$m$ stands for 1 or 2,
$Q_1$ stands for a —CH$_2$—CH$_2$— or a

—CH$_2$—C≡C—CH$_2$— group,
$Q_2$ stands for a

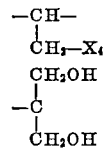

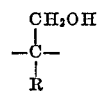

—(CHOH)$_n$— wherein $n$ stands for a positive integer preferably 1 to 6, or a

group,
$Q_3$ stands for a lower (C$_1$-C$_5$) alkylene group, preferably an ethylene, or propylene group, including a substituted ethylene or propylene group e.g. substituted with a hydroxy, an amino, a mercapto or a methyl group,
Y stands for oxygen, sulphur or a

—N—
|
R group, and
R in the preceding R substituted groups stands for hydrogen or an organic group e.g. an aliphatic group preferably a lower alkyl (C$_1$-C$_5$) group or an aromatic e.g. a phenyl group.

The present invention includes further the use of mono- and/or oligosaccharides as chemical sensitizers.

Specific examples of chemically sensitizing mono- and oligosaccharides and of chemically sensitizing organic polyfunctional compounds according to the above general formulae are listed in Table 1 hereinafter.

TABLE 1

| | |
|---|---|
| 1 | (HOCH$_2$—CH$_2$—)$_2$NH |
| 2 | HOCH$_2$—CH$_2$—NH—CH$_2$—CH$_2$—NH$_2$ |
| 3 | (HOCH$_2$—CH$_2$—)$_3$N |
| 4 | (HOCH$_2$—CH$_2$—)$_2$N—CH$_3$ |
| 5 | HO—CH—CH$_2$—NH$_2$<br>       \|<br>     CH$_2$OH |
| 6 | HO—CH—CH$_2$OH<br>       \|<br>    CH$_2$—SH |
| 7 | HS—CH$_2$—CH$_2$—NH$_2$ |
| 8 | (HOCH$_2$—CH$_2$—)$_2$S |
| 9 | HOCH$_2$—CH$_2$—NH$_2$ |
| 10 | HOCH$_2$—CH$_2$OH |
| 11 | H$_2$N—CH$_2$—CH$_2$—NH$_2$ |
| 12 | (H$_2$N—CH$_2$—CH$_2$—)$_2$NH |
| 13 | CH$_2$—NH$_2$<br>   \|<br>HO—CH—CH$_2$—NH$_2$ |
| 14 | (HOCH$_2$—CH—)$_2$O |
| 15 | HOCH$_2$—CH—CH—CH—CH—CH$_2$OH (with OH groups) |
| 16 | (HOCH$_2$—CH$_2$—)$_2$N—CH(CH$_3$)$_2$ |
| 17 | O(—CH$_2$—CH$_2$—NH$_2$)$_2$ |
| 18 | HOCH$_2$—CHOH—CH$_2$OH |
| 19 | Fructose. |
| 20 | Glucose. |
| 21 | Arabinose. |
| 22 | Ribose. |
| 23 | Galactose. |
| 24 | Mannose. |
| 25 | Sucrose. |
| 26 | Xylose. |
| 27 | Raffinose. |
| 28 | CH$_2$OH<br>   \|<br>HOCH$_2$—C—NH$_2$<br>   \|<br>  CH$_2$OH |
| 29 | (HOCH$_2$—CH$_2$—)$_2$N—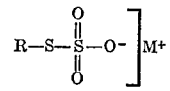 |
| 30 | (HOCH—CH$_2$—)$_2$N<br>       \|<br>     CH$_3$ |
| 31 | HOCH$_2$—C≡C—CH$_2$OH |
| 32 | HOCH$_2$—CH$_2$SH |
| 33 | (HOCH$_2$—)$_4$C |
| 34 | (HOCH$_2$—)$_3$C—CH$_2$—CH$_3$ |
| 35 | HOCH$_2$—CH$_2$—N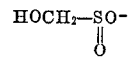 |
| 36 | HO—(CH$_2$)$_2$—O—(CH$_2$)$_2$—O—(CH$_2$)$_2$—OH |
| 37 | HOCH$_2$—(CHOH)$_4$—CH$_2$OH |

Other compounds that sensitize the lead(II) oxide-containing recording layer, particularly in wet state, and possess reducing properties and/or contain a releasable sulphur, selenium or tellurium atom are selected from the group consisting of:

(1) Thiol compounds or thiolates preferably having a water-soluble character e.g. a thiol compound or thiolate containing a hydrophilic group (a group increasing the water-solubility of the compound) such as a hydroxyl group or an ionic group, e.g. a free acid, carboxylate or sulphonic acid salt group, (2) Compounds corresponding to the following structural formula:

$$\left[ R-S-\overset{O}{\underset{O}{\overset{\|}{\underset{\|}{S}}}}-O^- \right] M^+$$

wherein:

M$^+$ represents a cation, e.g. a hydrogen ion, metal ion or onium group but is not present when the radical R already contains a cationic rest (betaine type compound), and R represents an organic group, e.g. an alkyl, aryl or heterocyclic group including said groups in substituted state, preferably substituted with a hydrophilic group, e.g. a hydroxyl group, a carboxylate group or a sulphonate group.

(3) Compounds yielding HSO$_3^-$ ions,
(4) Compounds yeilding SO$_3^{--}$ ions,
(5) Compounds yielding $$HOCH_2-\overset{O}{\underset{O}{\overset{\|}{\underset{\|}{S}}}}O^-$$

ions, M—O—S—O$^-$ ions wherein M is a cation, or SO$_2^{--}$ ions derived from the hypothetical sulphoxylic acid S(OH)$_2$, (6) Compounds yielding S$^{--}$ ions or M—S$^-$ ions, wherein M is a cation,
(7) Compounds yielding S$_2$O$_4^{--}$ ions,
(8) Compounds yielding SCN$^-$ ions,
(9) Organic isothiocyanates,
(10) Compounds containing a

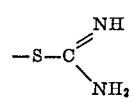

group,

(11) Compounds containing a

group,

(12) Compounds containing a —S—S— group,
(13) Compounds containing a —S$_x$— group, wherein $x$ is larger than 2,
(14) Compounds containing a —SR$_1$ group, wherein R$_1$ is an organic group linked through carbon to the sulphur atom, e.g. acyl preferably —COCH$_3$, alkyl preferably C$_1$-C$_4$ alkyl, aryl e.g. phenyl or a heterocyclic group,
(15) Compounds containing a —S—CX=N— group wherein X is an amino or an hydrazino group, and said sulphur-containing group makes part of a heterocyclic ring or ring system,
(16) Compounds containing a >C=S group,
(17) Compounds yielding S$_2$O$_3$$^{--}$ ions,
(18) Xanthates, i.e. salts of xanthic acid having the general formula: R$_2$O·CS·SM, wherein M is a cation and R$_2$ is an alkyl or substituted alkyl group, e.g. a benzyl group.

Said chemical sensitizing compounds may be used in a rather large amount, e.g. in a ratio by weight up to 1:2 in respect of the photosensitive lead(II), oxide, preferably in a range of 1:100 to 1:1.

Particularly suited representatives of that group are listed in the following Table 2.

TABLE 2

1....... Na$_2$S$_2$O$_3$
2....... Na$_2$S$_2$O$_4$
3....... Na$_3$AsS$_4$·8H$_2$O
4....... P$_2$S$_5$
5....... KSCN
6....... NaHSO$_3$
7....... NH$_4$SCN
8....... HS—CH$_2$—COOH

9.......  HS—CH$_2$—CH(SH)—CH$_2$—OH

10...... CH$_2$—COOH
         |
         CH—COOH
         |
         SH

11...... H$_3$C—⌬—SO$_2$—SNa

12...... (H$_5$C$_2$)(H$_5$C$_2$)N—⌬(—S—SO$_3$H)—NH$_2$

13...... ⌬—NH—N=C(S—CH$_2$—CH$_2$—CH$_2$—CH$_2$—SO$_3$Na)(S—CH$_2$—CH$_2$—CH$_2$—CH$_2$—SO$_3$Na)

14...... H$_2$N—CH$_2$—CH$_2$—S—S—CH$_2$—CH$_2$—NH$_2$·2HCl

15...... S=C(—OC$_2$H$_5$)(SK)

16...... H$_3$C—CO—S—CH$_2$—CH$_2$—CH$_2$—SO$_3$Na
17...... H$_3$C—CS—NH$_2$
18...... H$_2$N—CS—NH$_2$
19...... H$_2$C=CH—CH$_2$—NH—CS—NH$_2$

20...... OH—⌬(—S—C(NH·HCl)(NH$_2$))—OH

21...... H$_2$N—CS—NH—NH$_2$

22...... H$_5$C$_2$OOC—CH$_2$—CH$_2$—S—C(NH)(NH$_2$)·HCl

TABLE 2—Continued

23...... H$_2$N—CS—NH—NH—CS—NH$_2$

24...... H$_3$C—C(CH$_3$)(S—C=S)(HN—NH) (5-membered ring)

25...... HO$_3$S—benzothiazole—C—NH—NH$_2$

26...... S=C(S)(HN—NH)C=S (5-membered ring)

27...... H$_3$C—CO—NH—CS—NH$_2$
28...... H$_2$N—CS—CS—NH$_2$
29...... H$_2$N—CH$_2$—CH$_2$—SH
30...... H$_5$C$_2$—S—CH$_2$—CH$_2$—NH$_2$
31...... (NH$_4$)$_2$S$_2$O$_3$
32...... K$_2$S$_2$O$_5$
33...... Na$_2$SO$_3$

34...... O=S(—ONa)(CH$_2$OH)

As selenium and tellurium compounds are particularly mentioned allylselenourea and allyltellurourea. Further have to be mentioned selenium and tellurium compounds, which are derived structurally from oxyacids, wherein one or more of the oxygen atoms has been replaced by selenium or tellurium.

Other chemical sensitizing agents particularly suitable for sensitizing the recording material in wet state are listed in the following Table 3.

TABLE 3

(1)...... HO—⌬—NH$_2$·HCl (2)...... pyridine—COOH (3)...... OH—⌬—OH

4....... H$_2$N—NH$_2$·H$_2$O

5....... HOCH$_2$—CHOH—HC(—O—)(—C(=O))—HO—C=C—OH

6....... H$_2$N—⌬—NH$_2$

7....... OH—⌬(HO—)—OH

8....... ⌬—NH—NH—CO—CH$_3$

9....... HOCH$_2$—CH$_2$—NH—NH$_2$
10...... H$_3$C—NH—NH$_2$
11...... NaH$_2$PO$_2$·H$_2$O

12...... OH—⌬(HO—)—OH

TABLE 3—Continued

13. H₃C-HCOH-H₂C\N-CH₂-CH₂-N/CH₂-CHOH-CH₃
    H₃C-HCOH-H₂C/         \CH₂-CHOH-CH₃

14. H₂N—CH₂—COOH

15. 
```
         H
         N
    H₃C-HC/ \NH·HCl
        H₂C—C=O
```

16. 
```
        O
    H₂C/ \S=O
    HOCH₂—HC—O
```

17. Naphthalene with OH and OCH₃

18. KAsO₂

19. 
```
              CH₂—CH₂OH
              |
    H₃C—(CH₂)₁₇—N  →  O
              |
              CH₂—CH₂OH
```

20. 
```
              CH₂—CH₂OH
              |
    H₃C—(CH₂)₁₁—N  →  O
              |
              CH₂—CH₂—OH
```

21. H₃C—CHOH—CH₂\N—CH₂—CHOH—CH₃
    H₃C—CHOH—CH₂/

22. Pyridine N-oxide

23. Pyridine

24. 
```
         OH
         |
    H₃C—C—CH₂—CHOH—CH₃
         |
         CH₃
```

25. 
```
         CH₃
         |
    [H₃C—N⁺—CH₃] OH⁻
         |
         CH₃
```

26. HO—⟨benzene⟩—OH

---

The chemical sensitizing compounds of Table 3 are preferably applied in the same amounts as specified for the compounds of the type of Table 2.

The photosensitive lead compounds may be treated with the chemical sensitizers before, during or after their application to the support. Preferably they are added to the coating composition before coating and intimately mixed, e.g. ground, therewith or applied in a liquid penetrating into the recording layer so that a chemical interaction can take place.

Substances forming the continuous phase of the light-sensitive layer used in the present invention may be hydrophilic as well as organophilic binding agents or mixtures thereof. As hydrophilic binding agents preferably those of the water-permeable type are used, e.g. gelatin and analogous water-soluble hydrophilic colloids.

As suitable organophilic binding agents, which are not soluble in water and which can be applied in dissolved state from an organic solvent, are particularly mentioned sucrose benzoate, partially or completely acetalized polyvinyl alcohol, e.g. copoly(vinyl alcohol/vinyl-n-butyral) and poly(vinyl-n-butyral), ethylcellulose, shellac, polyvinyl stearate, copoly(vinyl acetate/N-vinylpyrrolidone), copoly(methacrylic acid/methyl methacrylate) and copoly(acrylic acid/N-vinylpyrrolidone).

As hydrophilic colloids, hydrophilic natural colloids, modified hydrophilic natural colloids or synthetic hydrophilic colloids may be used. More particularly they may be selected from such film-forming natural or modified natural hydrophilic colloids that do not adversely effect the photographic properties of the light-sensitive lead compound e.g. gelatin, glue, casein, zein, hydroxyethylcellulose, carboxymethylcellulose hydroxypropylstarch, gum arabic, sodium alginate, and hydrophilic derivatives of such colloids. They may also be selected from synthetic hydrophilic polymers as, e.g., poly (vinyl alcohol) partially acetalized polyvinyl alcohol or partially hydrolyzed polyvinyl acetate, preferably poly(vinyl-n-butyral/vinyl alcohol) containing at least 5 mole percent of vinyl alcohol units, poly(vinylpyrrolidone), poly(vinylamine), urea-formaldehyde resin, dimethylolmelamine-formaldehyde resin, poly(ethylene oxide), polyacrylamide or polyacrylates and hydrophilic copolymers and derivatives of such polymers e.g. copoly(acrylic acid/acrylamide/sodium acrylate). A hydrophilic and water-permeable colloid gelatin is preferred.

The hydrophilic binder material used in the recording layer is preferably hardened to some extent in order to obtain a layer with higher mechanical strength. Thus, e.g., a hydrophilic binding agent of the gelatin type may be hardened by reaction with an aldehyde such as formaldehyde or glyoxal. The hardening agents may be incorporated into the coating composition by admixing or into the coated layer by imbibition. The use of latent hardening agents, from which, e.g., the hardening agent is generated by heating, is not excluded.

The amount and type of hardening agent depends on the mechanical strength desired. When gelatin is used the amount of hardening agent may be in the range of 0.5 to 5% by weight in respect of gelatin. The hardening of the recording layer may be effected with a solution containing the hardening agent in an amount of 2 to 25% by weight.

The flexibility of the recording layer may be improved by means of plasticizing agents known in the art, e.g., latices, and phosphonic or phosphoric acid esters of polyols and/or monoalkylene glycol alkyl ethers and/or polyoxyalkylene glycol monoalkyl ethers.

The support of the recording material securing sufficient mechanical strength to the material may be a paper support, a metal sheet or a synthetic film support, which is either transparent or not. The recording layer must strongly adhere to the support for not getting loose therefrom during processing. If necessary one or more appropriate subbing layers are applied between the support and the recording layer.

The ratio by weight of binding agent to light-sensitive lead compound is preferably between 9:1 and 1:3. The amount of light-sensitive lead compound per sq. m. can vary within wide limits but is preferably at least 1 g. per sq. m.

The exposure of recording materials described in the present invention proceeds with active electromagnetic radiation i.e. radiation of a suitable wavelength and intensity for producing a print-out image by means of the described lead(II) oxide The recording materials of the present invention are suited for the reproduction of line work as well as for the reproduction of continuous tone originals and for the recording of signals as are obtained from modulated spot recording systems and recording systems wherein penetrating rays such as X-rays, beta-rays or gamma-rays are applied. Preferably the exposure proceeds with electromagnetic radiation rich in ultra-violet rays, e.g. produced by a carbon arc lamp or high pressure mercury vapour tube. When dye-sensitized lead(II) oxide is used, a print-out image can be obtained by using a tungsten filament lamp or a flash lamp mainly emitting in the visible spectrum.

Suitable spectrally sensitizing dyes can be found in the class of the methine dyes known in silver halide photography e.g.

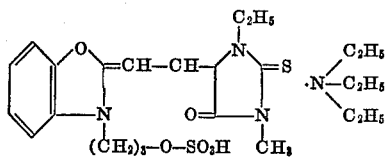

and

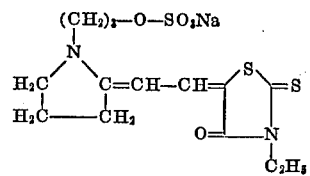

The recording material may be exposed in dry or wet state, e.g. after dipping it in an aqueous solution containing the above chemical sensitizers. When the recording material is exposed without previous wetting, it preferably contains a wetting agent or water-attracting compound, e.g. glycerol or low moleculari weight polyoxyethylene glycol (e.g. having a molecular weight lower than 500), or water-attracting salts and hydratable metal oxides, e.g. lithium chloride and zinc oxide. The sensitivity is markedly increased by heating the chemically sensitized recording material. According to a preferred embodiment the recording material is heated between 60 and 150° C. during its information-wise exposure.

The stabilization of the print-out image is preferably carried out by treating the exposed recording layer with an aqueous solution containing halide ions preferably chloride ions, e.g. by using an aqueous ammonium chloride solution. Other aqueous stabilizing solutions contain water-soluble carboxylic acids preferably acetic acid.

When an organophilic binding agent is used, the water of the stabilizing solution can be replaced partially or entirely by a suitable organic solvent penetrating into the recording layer.

The problem of providing an image background possessing a contrast as high as possible can be solved, e.g., by using yellow lead(II) oxide or by bleaching the surface of the lead(II) oxide grains by allowing to absorb thereon chemical substances, e.g. from an aqueous calcium chloride solution, whereby a chemical substance with white colour or a more neutral colour tone is formed on the lead(II) oxide grains.

The following examples illustrate the present invention. The percentage values are by weight if not otherwise indicated.

EXAMPLE 1

223 g. of yellow lead(II) oxide doped with 30 p.p.m. of bismuth and 50 g. of triethanolamine were ball-milled together for 2 h. in 1000 ml. of a 4% casein solution in demineralised water.

This composition was coated onto a paper support in a proportion of 100 g./sq. m. After drying, the material was exposed through a transparent negative in a Buroza 600 apparatus (trade name of Atlas, Delft, Netherlands, for a diazoprint apparatus) at a travelling speed of 40 m./min.

A black positive print-out image on light-yellow background was obtained. The maximum image density measured by reflection amounted to 1.10, the fog density being only 0.12.

The image was stabilized by dipping it for 1 min. into a solution containing the following ingredients:

| | G. |
|---|---|
| Polyethylene oxide polymer (average molecular weight: 4000) | 20 |
| Acetic acid | 20 |
| Sodium chloride | 10 |
| Water | 100 |

After rinsing with water and drying, a black image on a white background was obtained ($D_{max}$=0.9; fog=0.08).

Results of the same quality were obtained by replacing triethanolamine by a same amount of one of the first ten compounds of Table 1.

EXAMPLE 2

120 g. of yellow lead(II) oxide doped with 30 p.p.m. of bismuth were ball-milled for 12 h. with 120 g. of potassium disulphite ($K_2S_2O_5$) in 160 cc. of demineralised water. With thorough stirring this suspension was added at 35° C. to a mixture consisting of:

| | |
|---|---|
| 15% solution of gelatin in demineralized water __g__ | 500 |
| Demineralised water _____cc__ | 140 |
| Glycerol _____g__ | 30 |
| 12.5% solution of saponin in demineralized water g__ | 5 |

This composition was coated onto a paper support in a proportion of 100 g./sq. m. After drying, the material was exposed through a transparent negative in a Buroza 600 (trade name) apparatus at a travelling speed of 40 cm./min. A black positive print-out image on light yellow background was obtained. $D_{max}$ measured by reflexion amounted to 0.92 and fog to 0.17.

EXAMPLE 3

120 g. of yellow lead(II) oxide doped with 30 p.p.m. of bismuth were ball-milled for 12 h. in 140 ml. of demineralised water. The suspension formed was then added to the following mixture at 35° C. under thorough stirring:

| | |
|---|---|
| Demineralised water _____cc__ | 160 |
| 15% solution of gelatin in demineralized water __g__ | 500 |
| 12.5% solution of saponin in demineralised water g__ | 5 |
| 4% solution of formaldehyde in demineralized water _____g__ | 5 |

This composition was applied to a raw paper support in a proportion of 90 g./sq. m. After drying, the material was dipped in a 2% aqueous solution of potassium ethyl xanthate and then when still wet image-wise exposed for 2 min. by means of a Philips HP 80 lamp placed at a distance of 35 cm. A black print-out image was obtained.

EXAMPLE 4

The following ingredients were mixed under thorough stirring:

| | G. |
|---|---|
| Poly(vinyl-n-butyral) | 40 |
| Methanol | 810 |
| Yellow lead(II) oxide containing 30 p.p.m. of bismuth | 150 |
| Mercapto-acetic acid | 30 |

This composition was coated onto a paper support at a rate of 105 g./sq. m. After drying, the material obtained was exposed for 4 min. by means of a 150 w. xenon lamp placed at a distance of 5 cm. A greyish-black image on light yellow background was obtained.

EXAMPLE 5

40 g. of poly(vinyl-n-butyral), 460 g. of methanol and 150 g. of yellow lead(II) oxide as described in Example 4 were ball-milled for 12 h. To the suspension obtained 350 g. of methanol were added, whereupon the suspension was coated to a paper support in a proportion of 100 g./sq. m. After drying, this material was dipped in a 2% solution of sodium thioarsensate-8-water $$(Na_3AsS_4 \cdot 8H_2O)$$

in methanol, and then when still wet exposed image-wise for 2 min. by means of a Philips HP 80 lamp placed at a distance of 35 cm. A black image on light-yellow background was obtained.

EXAMPLE 6

2 g. of sodium hexametaphosphate and 24 g. of yellow lead(II) oxide containing 30 p.p.m. of bismuth were ball-milled for 1 h., in 32 g. of dimineralised water. To the suspension obtained was added the following solution at 35° C. with stirring:

|  | G. |
|---|---|
| 15% solution of gelatin in demineralised water | 100 |
| Sodium thiosulphate | 16 |
| Demineralised water | 28 |
| Glycerol | 6 |
| 12.5% aqueous solution of saponine | 1 |

The obtained suspension was applied in such a way to a subbed cellulose triacetate support that the light-sensitive layer formed was 28μ thick. After an image-wise exposure by means of a Philips HPR 125 lamp for 15 min., the print-out image obtained was stabilised by dipping it for 1 min. in a 10% solution of ammonium fluoride in demineralised water. Then the material was rinsed and dried. A black image was obtained on a white background. This image was insensitive to any further action of light. The density of the exposed and the non-exposed areas measured by reflected light amounted to 1.02 and 0.18 respectively.

EXAMPLE 7

24 g. of yellow leead(II) oxide doped with 500 p.p.m. of molybdenum were ball-milled for 1 h. in 32 g. of demineralised water. To the suspension obtained were added the following solutions at 35° C. with stirring:

|  | G. |
|---|---|
| 15% solution of gelatin in demineralised water | 100 |
| Demineralised water | 28 |
| Ethylene glycol | 6 |
| 12.5% solution of saponine in demineralised water | 1 |

The obtained suspension was applied in such a way to a subbed cellulose triacetate support that the light-sensitive layer formed was 25μ thick. The light-sensitive material obtained was then exposed through a transparent negative in a Buroza 600 (trade name) diazoprint apparatus at a travelling speed of 40 cm./min. A black positive print-out image was obtained.

EXAMPLE 8

2 g. of sodium hexametaphosphate and 24 g. of yellow lead(II) oxide containing 140 p.p.m. of bismuth were ball-milled for 1 h. in 120 g. of demineralised water. To the suspension obtained the following solution was added:

|  | G. |
|---|---|
| 4% solution of a copolymer (acrylamide/acrylic acid/sodium acrylate) (80/4/16) in demineralised water | 100 |
| Glycerin | 6 |
| 12.5% solution of saponin in demineralised water | 1 |

To a subbed cellulose triacetate support the suspension was applied in such a way that the light-sensitive layer after having been dried was 23μ thick. The sensitive material was then exposed as described in Example 7. A black print-out image was obtained.

EXAMPLE 9

15 g. of yellow lead(II) oxide doped with 95 p.p.m. of bismuth were dispersed with thorough stirring into a solution of 4 g. poly(vinyl-n-butyral) in 46 ml. of methanol. To the suspension obtained was added a solution of 3 g. of ascorbic acid in 32 ml. of methanol.

This composition was coated onto a paper support in such a way that 14 g. of lead(II) oxide were present per sq. m. After drying, the material was exposed through a transparent negative in a Buroza 600 (trade name) apparatus at a travelling speed of 13 cm./min. A black positive print-out image on a light yellow background was obtained. The maximum density ($D_{max}$) measured with reflected light amounted to 0.80.

EXAMPLES 10–13

2 g. of sodium hexametaphosphate and 24 g. of yellow lead(II) oxide containing 30 p.p.m. of bismuth were ball-milled for 1 h. in 32 g. of demineralised water. To this suspension were added the following solutions at 35° C. with stirring:

|  | G. |
|---|---|
| 15% solution of gelatin in demineralised water | 100 |
| Sensitizing agent (see the table hereinafter) | 2 |
| 12.5% aqueous solution of saponin | 1 |

The different suspensions were applied in such a way to a paper support that 26 g. of lead(II) oxide were present per sq. m. After an image-wise exposure in a Buroza 600 (trade name) apparatus at a travelling speed of 20 cm./min., the following results were recorded when the densities obtained were measured with reflected light.

| Ex. | Sensitizing agent | Dmax | Fog |
|---|---|---|---|
| 10 | No addition | 0.31 | 0 05 |
| 11 | 2 g. of $KAsO_2$ | 0 71 | 0 07 |
| 12 | 2 g. of Rongal HT type 66 (an addition product of formaldehyde and sodium dithionite sold by Badische Anilin- and Soda-Fabrik AG, Ludwigshafen, W. Germany). | 0.82 | 0.08 |
| 13 | 2 g. of $H_2N-NH_2 \cdot H_2O$ | 1.10 | 0.06 |

EXAMPLE 14

24 g. of yellow lead(II) oxide doped with 30 p.p.m. of bismuth were ball-milled for 1 h. in 60 ml. of demineralised water. With thorough stirring this suspension was added to a mixture consisting of:

| 10% solution in demineralised water of a polyoxyethylene glycol having an average molecular weight of 6000 _____ ml | 100 |
|---|---|
| Phloroglucinol _____ g | 6 |
| 12.5% solution of saponin in demineralised water _____ ml | 1 |

This composition was coated onto a paper support in such a way that 11.5 g. of lead(II) oxide were present per sq. m. After drying, the light-sensitive material obtained was image-wise exposed for 5 min. by means of a Philips HP 80 lamp placed at a distance of 35 cm. A black print-out image with a $D_{max}$ of 0.87 when measured with reflected light was obtained.

EXAMPLES 15–17

1 g. of sodium hexametaphosphate and 100 g. of yellow lead(II) oxide containing 30 p.p.m. of bismuth were ball-milled for 1 h. in 500 ml. of demineralised water. To this suspension were added the following solutions at 35° C. with stirring:

| 15% solution of gelatin in demineralised water _ml | 500 |
|---|---|
| Sensitizing agent _____ g | 30 |
| Demineralised water _____ ml | 100 |

The different suspensions obtained were applied in such a way to a subbed cellulose triacetate support that 12 g. of lead(II) oxide were present per sq. m. After an image-wise exposure as described in Example 14, following results were recorded, the densities obtained having been measured by transmitted light.

| Ex. | Sensitizing agent | Dmax | Fog |
|---|---|---|---|
| 15 | No addition | 0.32 | 0.24 |
| 16 | 30 g. of glycerol | 0.83 | 0.23 |
| 17 | 30 g. of sorbitol | 0.73 | 0.24 |

EXAMPLE 18

223 g. of yellow lead(II) oxide (doped with 30 p.p.m. of bismuth) and 95.5 g. of tri-isopropanolamine were ball-milled together for 2 h. in a mixture of 300 ml. of a 7% by weight solution of casein in demineralised water and 200 ml. of a 10% by weight solution of co-poly(acrylamide/acrylic acid/acrylid acid sodium salt) (the weight ratio of monomers being 80/4/16) in demineralised water. This composition was coated onto a paper support in a proportion of 100 g./sq. m.

The dried material was exposed through a transparent negative in a Buroza 600 copying apparatus (trade name). A gray print-out image on a light yellow background was obtained. The maximum image density measured with reflected light was 0.18, the fog density level attaining 0.08.

If the same material was exposed on an Actina S apparatus (trade name of Regino, Brussels, Belgium for a diazocopying apparatus) a black positive print-out image was obtained. The maximum image density measured with reflected light amounted to 1.08, the fog density level attaining 0.17.

The main difference between the "Buroza" and the "Actina S" apparatus is that the first mentioned heats the recording sheets during the exposure at 35°–40° C., and the other at a more elevated temperature viz at 85°–90° C., i.e. the temperature measured at the glass cylinder where the sheet passes.

We claim:

1. In a photosensitive print-out recording material containing a water-permeable recording layer, the improvement wherein the essential photosensitive constituent of said layer is light-sensitive lead(II) oxide consisting at least 25% by weight or orthorhombic crystalline lead(II) oxide, and said lead oxide is dispersed in a hydrophilic water-permeable binding agent, said light-sensitive lead(II) oxide being present in the amount of at least about 1 g./sq. m. and being admixed with a chemical sensitizing agent increasing the light-sensitivity of said lead oxide and selected from the group consisting of:
 (1) an organic polyfunctional compound having at least two chemical functional groups each being selected from a hydroxy, mercapto, or primary or secondary amino groups, and having one of the following general formulae:

(1) $X_1$—$Q_1$—$X_2$
 (2) $X_3$—$Q_2$—$X_4$
 (3) $X_5$—(CH$_2$—CH$_2$—Y)$_m$—CH$_2$—CH$_2$—X$_4$
 (4) 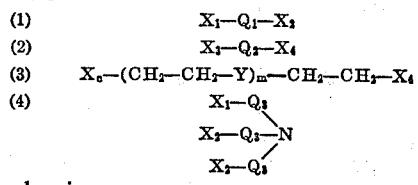

wherein:
 $X_1$ stands for a —OH, —SH, —NHR or a cyclic amino group,
 $X_2$ stands for a —OH, —SH or —NHR group,
 $X_3$ stands for a —OH, —SH, —NHR, —CH$_2$OH, —CH$_2$SH, —CH$_2$NHR,

—C(R)$_3$—, halogen or a cyclic amino group,
 $X_4$ stands for a —OH, —SH, —NHR, —CH$_2$OH, —CH$_2$SH or a —CH$_2$NHR group,
 $m$ stands for 1 or 2,
 $Q_1$ stands for a —CH$_2$—CH$_2$— or a

group, $Q_2$ stands for a

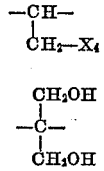

—(CHOH)$_n$— wherein $n$ stands for a positive integer or a

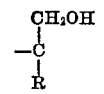

group, $Q_3$ stands for a lower ($C_1$–$C_5$) alkylene group including a substituted lower alkylene group,
Y stands for oxygen, sulphur or a

group, and
R represents an aliphatic or aromatic group;
(2) a sulphur compound or a compound wherein sulphur has been replaced by selenium or tellurium which possesses reducing properties and/or contains a releasable sulphur, selenium or tellurium atom, and having one of the general formulae:
 (1) thiol compounds or thiolates,
 (2) compounds corresponding to the following structural formula:

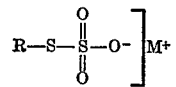

wherein:
  M$^+$ represents a cation which is missing when the radical R already contains a positive charge, and
  R represents an alkyl, aryl or heterocyclic group,
 (3) compounds yielding HSO$_3^-$ ions,
 (4) compounds yielding SO$_3^{--}$ ions,
 (5) compounds yielding

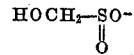

ions, M—O—S—O$^-$ ions wherein M is a cation or SO$_2^{--}$ ions derived from the hypothetical sulphoxylic acid S(OH)$_2$,
 (6) compounds yielding S$^{--}$ ions or M—S$^-$ ions, wherein M is a cation,
 (7) compounds yielding S$_2$O$_4^{--}$ ions,
 (8) compounds yielding SCN$^-$ ions,
 (9) organic isothiocyanates,
 (10) compounds containing a

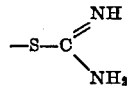

group,
 (11) compounds containing a

group,

(12) compounds containing a —S—S group,
(13) compounds containing a —S$_x$— group, wherein $x$ is larger than 2,
(14) compounds containing a —SR$_1$ group, wherein R$_1$ is an acyl alkyl, aryl or heterocyclic group linked through carbon to the sulphur atom,
(15) compounds containing a —S—CX=N— group, wherein X is an amino or a hydrazino group, and said sulphur-containing group forms part of a heterocyclic ring or ring system,
(16) compounds containing a >C=S group,
(17) compounds yielding S$_2$O$_3$$^{--}$ ions, and
(18) xanthates; or (3) a compound identified in Table 3 of the specification.

2. A photosensitive article according to claim 1, wherein the lead(II) oxide is present in the form of grains having a specific surface of at least 0.30 sq. m. per gram.

3. A photosensitive article according to claim 1, wherein the lead(II) oxide has been doped with a metal.

4. A photosensitive article according to claim 1, wherein the lead(II) oxide has been doped with bismuth or molybdenum.

5. A photosensitive article according to claim 1, wherein the binding agent comprises gelatin, casein or polyvinyl alcohol.

6. A photosensitive article according to claim 1, wherein the binding agent comprises poly(vinyl-n-butyral) and polyvinyl alcohol.

7. A photosensitive article according to claim 1, wherein the binding agent consists of a copoly(vinyl-n-butyral/vinyl alcohol) containing at least 5 mole percent of vinyl alcohol groups.

8. A photosensitive article according to claim 1, wherein the ratio by weight of binding agent relative to the lead(II) oxide is comprised between 9:1 and 1:3.

9. A photosensitive article according to claim 1, wherein said polyfunctional organic compound contains at least one hydroxyl group.

10. A photosensitive article according to claim 1, wherein the amount of polyfunctional compound relative to 1 mole of the lead(II) oxide is between 0.01 and 1.5 equivalent calculated on the basis of the hydroxy, mercapto, primary or secondary amino groups present in said compound.

11. A photosensitive article according to claim 10, wherein the molar ratio of lead(II) oxide to polyfunctional organic compound is 1 mole of lead (II) oxide for 1 mole of polyfunctional compound divided by the number of hydroxy groups present in one polyfunctional molecule.

12. A photosensitive article according to claim 1, wherein said sensitizing agent is used in a ratio by weight in respect of lead(II) oxide in the range of 1:100 to 1:1.

13. A photosensitive article according to claim 1, wherein the recording latery contains a wetting agent, water-attracting polyol, deliquescent salt or hydratable metal oxide.

14. In a print-out process for recording information by information-wise exposing a photosensitive recording material to active electromagnetic radiation of sufficient intensity to produce a print-out image, the improvement wherein the recording material so exposed contains as the essential photosensitive constituent photosensitive lead(II) oxide consisting of at least 25% by weight of orthorhombic crystalline lead(II) oxide (massicot), said photosensitive lead oxide being sensitized with a chemical sensitizing agent increasing the light sensitivity thereof sufficient to produce a visible image on said exposure and selected from the group consisting of:

(1) an organic polyfunctional compound having at least two chemical functional groups each being selected from a hydroxy, mercapto, or primary or secondary amino groups, and having one of the following general formulae:

(1) X$_1$—Q$_1$—X$_2$
(2) X$_1$—Q$_2$—X$_4$
(3) X$_1$—(CH$_2$—CH$_2$—Y)$_m$—CH$_2$—CH$_2$—X$_4$
(4) 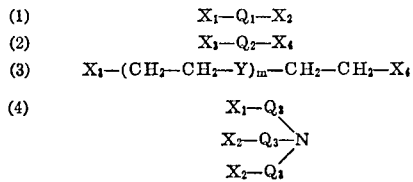

wherein:
X$_1$ stands for a —OH, —SH, —NHR or a cyclic amino group,
X$_2$ stands for a —OH, —SH or —NHR group,
X$_3$ stands for a —OH, —SH, —NHR, —CH$_2$OH, —CH$_2$SH, —CH$_2$NHR,

—C(R)$_3$—, halogen or a cyclic amino group,
X$_4$ stands for a —OH, —SH, —NHR, —CH$_2$OH, —CH$_2$SH or a —CH$_2$NHR group,
$m$ stands for 1 or 2,
Q$_1$ stands for a —CH$_2$—CH$_2$— or a CH$_2$—C≡C—CH$_2$ group,
Q$_2$ stands for a

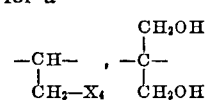

—(CHOH)$_n$— wherein $n$ stands for a positive integer or a

group,
Q$_3$ stands for a lower (C$_1$–C$_5$) alkylene group including a substituted lower alkylene group,
Y stands for oxygen, sulphur or a

group, and
R represents an aliphatic or aromatic group;
(2) a sulphur compound or a compound wherein sulphur has been replaced by selenium or tellurium which posesses reducing properties and/or contains a releasable sulphur, selenium or tellurium atom, and having one of the general formulae:
(1) thiol compounds or thiolates,
(2) compounds corresponding to the following structural formula:

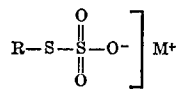

wherein:
M$^+$ represents a cation which is missing when the radical R already contains a positive charge, and
R represents an alkyl, aryl or heterocyclic group,
(3) compounds yielding HSO$_3$$^-$ ions,
(4) compounds yielding SO$_3$$^{--}$ ions,
(5) compounds yielding

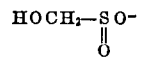

ions, M—O—S—O$^-$ ions wherein M is a cation or SO$_2$$^{--}$ ions derived from the hypothetical sulphoxylic acid S(OH)$_2$,
(6) compounds yielding S$^{--}$ ions or M—S$^-$ ions, wherein M is a cation,
(7) compounds yielding S$_2$O$_4$$^{--}$ ions, (8) compounds yielding SCN⁻ ions,
(9) organic isothiocyanates,
(10) compounds containing a

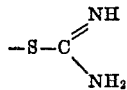

group,
(11) compounds containing a

group,
(12) compounds containing a —S—S group,
(13) compounds containing a —S$x$— group, wherein $x$ is larger than 2,
(14) compounds containing a —SR$_1$ group, wherein R$_1$ is an acyl, alkyl, aryl or heterocyclic group linked through carbon to the sulphur atom,
(15) compounds containing a —S—CX=N— group, wherein X is an amino or a hydrazino group, and said sulphur-containing group forms part of a heterocyclic ring or ring system,
(16) compounds containing a >C=S group,
(17) compounds yielding S$_2$O$_3$⁻⁻ ions, and
(18) xanthates; or
(3) a compound identified in Table 3 of the specification.

15. A process according to claim 14 wherein the lead(II) oxide has been doped with a metal selected from the group of bismuth and molybdenum.

16. A process according to claim 1, wherein the lead(II) oxide has been dispersed in a hydrophilic water-permeable binding agent.

17. A process according to claim 16, wherein the binding agent contains gelatin, casein or polyvinyl alcohol.

18. A process according to claim 16, wherein the binding agent contains a copoly(vinyl-n-butyral/vinyl alcohol) containing at least 5 mole percent of vinyl alcohol groups.

19. A process according to claim 16, wherein the ratio by weight of binding agent in respect of lead(II) oxide is comprised between 9:1 and 1:3.

20. A process according to claim 14, wherein the recording layer contains a wetting agent, water-attracting polyol, a deliquescent salt or hydratable metal oxide.

21. A process according to claim 14, wherein the recording layer is exposed in wet state.

22. A process according to claim 14, wherein the recording material is heated during its information-wise exposure.

23. A process according to claim 14, wherein the recording layer before its exposure is wetted with a solution containing a compound identified in Tables 2 and 3 of the specification.

24. A process according to claim 14, wherein the recording layer after its information-wise exposure is treated with an aqueous solution containing chloride ions or a compound containing a carboxylic acid group to convert said lead(II) oxide to a substantially colorless salt.

References Cited
UNITED STATES PATENTS

| | | | |
|---|---|---|---|
| 3,453,141 | 7/1969 | Anolick et al. | 252—501 X |
| 2,414,839 | 1/1947 | Schoen | 96—48 |
| 3,345,161 | 10/1967 | Mammino et al. | 252—501 X |
| 3,008,825 | 11/1961 | Van Dorn et al. | 96—1.8 |
| 3,266,932 | 8/1966 | Anolick | 117—201 |
| 3,369,905 | 2/1968 | Jones et al. | 96—107 |

FOREIGN PATENTS

| | | | |
|---|---|---|---|
| 1,043,250 | 9/1966 | Great Britain | 96—48 |
| 997,031 | 6/1965 | Great Britain | 96—107 |

NORMAN G. TORCHIN, Primary Examiner
W. H. LOUIE, JR. Assistant Examiner

U.S. Cl. X.R.
96—48; 117—201

UNITED STATES PATENT OFFICE
CERTIFICATE OF CORRECTION

Patent No. 3,700,452     Dated October 24, 1972

Inventor(s) Eric Maria BRINCKMAN et al

It is certified that error appears in the above-identified patent and that said Letters Patent are hereby corrected as shown below:

Claim 1, Column 14, line 15, correct the formula to read --

Claim 16, Column 17, line 34, change "claim 1" to -- claim 14 --.

Signed and sealed this 10th day of April 1973.

(SEAL)
Attest:

EDWARD M. FLETCHER, JR.
Attesting Officer

ROBERT GOTTSCHALK
Commissioner of Patents